April 21, 1925.

J. H. HAMMOND, JR

RECEIVING SYSTEM FOR RADIANT ENERGY

Original Filed Sept. 9, 1918   2 Sheets-Sheet 1

WITNESS
Chas F Clagett

INVENTOR
John Hays Hammond Jr.
BY
A. J. Gardner
HIS ATTORNEY

April 21, 1925.

J. H. HAMMOND, JR 1,534,704

RECEIVING SYSTEM FOR RADIANT ENERGY

Original Filed Sept. 9, 1918    2 Sheets-Sheet 2

WITNESS
Chas. F. Clagett

INVENTOR
John Hays Hammond Jr
BY
A. J. Gardner
HIS ATTORNEYS

Patented Apr. 21, 1925.

1,534,704

UNITED STATES PATENT OFFICE.

JOHN HAYS HAMMOND, JR., OF GLOUCESTER, MASSACHUSETTS.

RECEIVING SYSTEM FOR RADIANT ENERGY.

Application filed September 9, 1918, Serial No. 253,247. Renewed November 3, 1924.

*To all whom it may concern:*

Be it known that I, JOHN HAYS HAMMOND, Jr., a citizen of the United States, and a resident of Gloucester, in the county of Essex and State of Massachusetts, have invented certain new and useful Improvements in Receiving Systems for Radiant Energy, of which the following is a specification.

Some of the objects of this invention are: to provide an improved receiving system for radiant energy; to provide a receiving system responsive to a plurality of waves simultaneously received and having a predetermined phase difference; to provide a receiving system responsive to a selective system of radiant energy transmission; to provide a receiving system wherein a plurality of series or trains of waves are selectively received and the receiving mechanism caused to operate only as a result of a predetermined difference in phase of the received waves.

Figure 1:
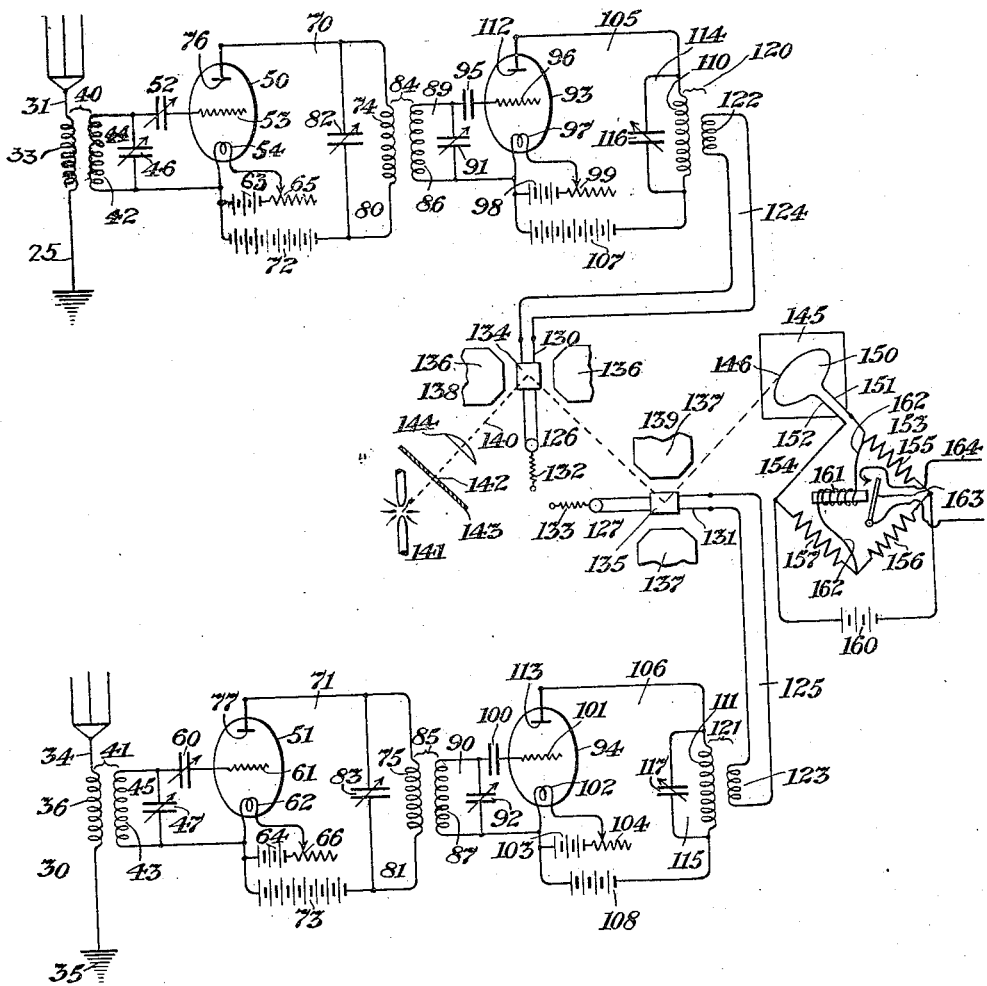
Figure 2:
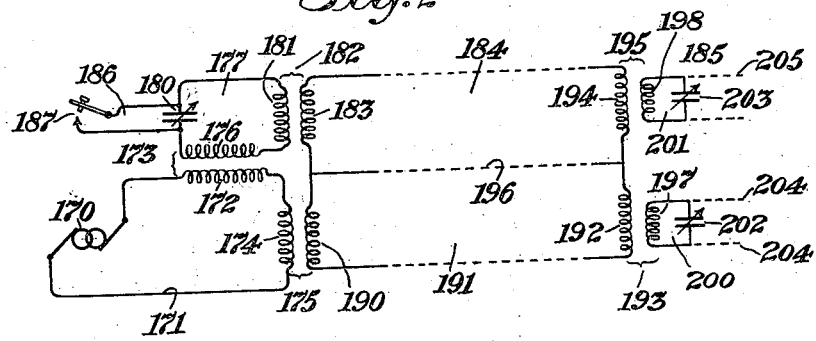
Figure 3:
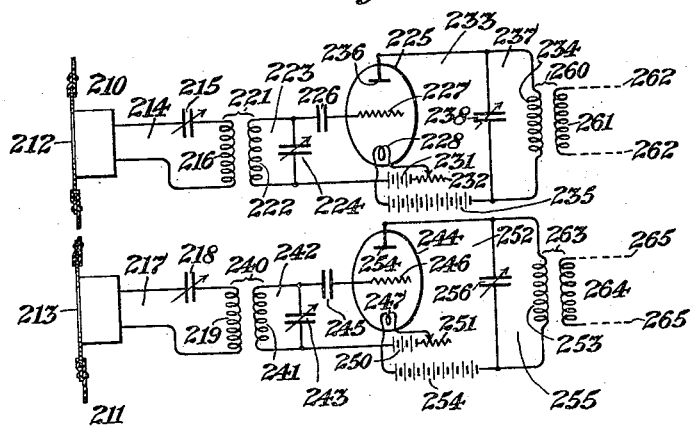

In the accompanying drawings, all of which are diagrammatic representations of systems constructed in accordance with this invention, Fig. 1 represents one form of receiving system for use with high frequency waves transmitted by wireless apparatus; Fig. 2 represents the system of the present invention adapted for use with wire telegraphy; and Fig. 3 represents another form of the system embodying the present invention as employed for receiving compressional waves such as employed in submarine signalling.

Referring to the drawings, and particularly to Fig. 1, one form of receiving system is shown constructed in accordance with this invention and arranged to receive two series of waves transmitted by a suitable selective transmission system adapted to emit two series of high frequency oscillations of different frequencies respectively, for instance of 200,000 cycles per second and 150,000 cycles per second. The receiving system shown in Fig. 1 comprises two open aerial circuits 25 and 30 including respectively an antenna 31 grounded as at 32 through an inductance 33, and an antenna 34 grounded as at 35 through an inductance 36. The two inductances 33 and 36 form the primaries of two transformers 40 and 41 which include respectively two secondary coils or inductances 42 and 43 which are arranged respectively in two closed oscillatory circuits 44 and 45 having the respective variable condensers 46 and 47. The oscillatory circuit 44 with the open aerial circuit 25 is tuned to one of the incoming high frequencies, say to 200,000 cycles and the other oscillatory circuit 45 with the open aerial circuit 30 is tuned to the other incoming high frequency, namely 150,000 cycles. The two closed circuits 44 and 45 are arranged respectively to control two primary detectors 50 and 51, one side of the condenser 46 leading through a stoppage condenser 52 to a grid 53 of the gaseous detector 50 while the other side of the condenser 46 leads to a heated filament 54 of the detector 50, and one side of the condenser 47 leads through a stoppage condenser 60 to a grid 61 of the gaseous detector 51 while the other side of the condenser 47 leads to a heated filament 62 of the detector 51. The filaments 54 and 62 are respectively arranged to be heated by batteries 63 and 64 in conjunction with controlling rheostats 65 and 66. The detectors 50 and 51 control respectively two closed circuits 70 and 71 including respectively the high potential batteries 72 and 73, the primary coils 74 and 75, and the plate electrodes 76 and 77 of the respective detectors 50 and 51. The two coils 74 and 75 are arranged respectively in two closed oscillatory circuits 80 and 81, which include respectively variable condensers 82 and 83. These two closed circuits 80 and 81 are tuned to the respective frequency of the amplitude variation of the incoming waves, say 1000 cycles per second. The coils 74 and 75 form the primary coils respectively of transformers 84 and 85, the secondary coils 86 and 87 of which are respectively in two closed oscillatory circuits 89 and 90 including variable condensers 91 and 92 and are also arranged to control respectively two detectors 93 and 94 of the gaseous type. One side of the condenser 91 is connected through a stoppage condenser 95 with a grid 96 of the detector 93 while the other side of the condenser 91 leads to a heated filament 97 of the detector 93 which filament is maintained heated by a battery 98 and controlled by a rheostat 99. One side of the condenser 92 leads through a stoppage condenser 100 to a grid 101 of the detector 94 while the other side of the condenser 92 leads to a heated filament 102 of the detector 94 which filament is heated by a battery 103 and controlled by a rheostat 104. The two detectors 93 and 94 respectively control two closed circuits 105 and 106 including respectively the high potential batteries 107 and 108; the primary coils 110 and 111; and the plate electrodes 112 and 113 of the detectors 93 and 94. The two coils 110 and 111 are arranged respectively in two closed oscillatory circuits 114 and 115 which include respectively variable condensers 116 and 117.

For the purpose of producing signals from received alternating electric currents having a predetermined phase difference, the coils 110 and 111 are arranged respectively as the primary coils of transformers 120 and 121, the secondary coils 122 and 123 of which are respectively in circuits 124 and 125 including the respective oscillograph suspensions 126 and 127. In the present form of the invention the oscillograph suspensions 126 and 127 consist respectively of hairpins of fine wire 130 and 131 which are held taut by springs 132 and 133 and carry respectively mirrors 134 and 135 which are located between the poles 136 and 137 of powerful magnets 138 and 139.

In order to give visible evidence of the alternating current the mirrors 134 and 135 are arranged in such a manner that their axes of oscillation are at right angles, while one of the mirrors 134 is located in the path of a beam of light 140 from an intense source of light such as an electric arc 141. This beam of light 140 traverses a small circular opening 142 in a screen 143 and is then brought to a focus for producing an image of the opening 142 by a lens 144 which is positioned at a suitable distance to produce the desired image. The arrangement is such that the beam of light will be reflected from each of the mirrors 134 and 135 in turn and finally will be brought to a focus upon a screen 145 which has been properly positioned and adjusted for this purpose. The effect of alternating currents passing respectively through the hairpin suspensions 130 and 131 is to cause the mirrors 134 and 135 to oscillate about the respective axes of suspension and consequently when the 1000 cycle alternating currents flow in the two oscillograph suspensions the foot 146 of the beam of light will trace designs of familiar pattern upon the screen 145. These designs are known as Lissajou's figures and they will be straight lines, ellipses or circles depending on amplitudes of and the phase difference between the two 1000 cycle currents.

For the purpose of utilizing the reflected light beams upon the screen 145 to cause the production of the desired signals a selenium cell 150 is mounted upon the screen 145 and has a configuration conforming to the circumferential contour of one of the figures, say for example, an ellipse, so that when a transmitted signal is being received the foot 146 of the light beam will describe a path, under the action of the oscillograph suspensions, which keeps it playing continuously upon some part of the selenium cell 150. The selenium cell 150 has its terminals 151 and 152 connected to some device sensitive to resistance change and in the present instance a Wheatstone bridge 153 is utilized, one arm 154 of which includes the selenium cell 150 while the remaining arms have other resistances 155, 156 and 157. A battery 160 supplies current for the resistance device and a suitable current indicating device such as an electro-magnet 161 is connected across the bridge by conductors 162 and serves to operate an armature arm 163 which may close a normally open circuit 164 to give the signal. In case the circuit 164 is a normally closed circuit it will be understood that the arm 163 may open that circuit. The arrangement of the bridge 153 is such that current flows through the electro-magnet 161 only when a signal is being received.

For the purpose of receiving a signal the oscillograph suspensions 130 and 131 are adjusted with respect to the screen 145 so that the foot 146 of the beam of light is positioned to describe a path which keeps it playing continuously upon some portion of the selenium cell 150 thereby decreasing the resistance of the selenium cell 150 and throwing the bridge 153 out of balance with the result that the magnet 161 attracts the armature 163. With an adjustment of this character maintained any change of the phase difference between the 1000 cycle currents will cause the design traced by the foot 146 of the beam of light to alter and to play upon the selenium cell 150 at only a few points along its path, the result being that the resistance of the selenium cell 150 is not sufficiently affected as to cause the magnet 161 to attract the arm 163.

For the purpose of utilizing the system of the present invention in connection with the usual wire telegraph there is shown in Fig. 2 a form of the invention which is operative to that end and wherein an alternator 170 which furnishes current, say 1000 cycles per second to a circuit 171 including a coil 172 which forms the primary of a transformer 173 and a coil 174 which forms the primary of a transformer 175. The transformer 173 has a secondary coil 176 in a closed circuit 177 including a variable condenser 180 and a primary coil 181 of a transformer 182 which has a secondary coil 183 included in a circuit 184 which controls the distant receiving station 185.

In order to short-circuit the condenser 180 to cause a variation in the phase of the current in the circuit 177 with respect to the current in the circuit 171, there is provided a normally open shunt-circuit 186 connected across the condenser 180 and having a key 187 which may be depressed at will to close the circuit 186 and shunt the condenser 180.

For the purpose of transmitting a current to the receiving station possessing a specific phase difference from that in the circuit 184 the transformer 175 has a secondary 190 in a circuit 191 which leads to the receiving station 185 where it includes a primary coil 192 of a transformer 193. The circuit 184 includes a primary coil 194 of a transformer 195 and both the circuits 184 and 191 in the present instance have a common return 196. The transformers 193 and 195 at the receiving station have secondary coils 197 and 198 respectively in closed oscillatory circuits 200 and 201 including respectively variable condensers 202 and 203, and these circuits 200 and 201 have leads 204 and 205 respectively connected to oscillograph suspension receiving apparatus as shown in Fig. 1 and which it is believed unnecessary to herein describe. The closed oscillatory circuits 200 and 201 are each tuned to the 1000 cycle frequency while the current passing through the coils 192 and 194 will be 1000 cycle alternating currents having a specific phase difference.

For the purpose of utilizing the system of the present invention to receive signals in the form of compressional waves such as are employed in submarine signalling, there is shown in Fig. 3 a form of the invention which is operative to that end and wherein a pair of electro-dynamic oscillators 210 and 211 are respectively mechanically tuned for example to 1500 and 1000 cycles so that the respective diaphragms 212 and 213 of these oscillators will vibrate when sound waves of these frequencies are received. The oscillator 210 through its diaphragm 212 controls a closed oscillatory circuit 214 including a variable condenser 215 and a primary coil 216 and gives rise to an alternating current of the corresponding frequency in the circuit 214, say to 1500 cycles. The oscillator 211 in a like manner controls a closed oscillatory circuit 217 including a variable condenser 218 and a primary coil 219 whereby vibration of the diaphragm 213, through sound waves of a frequency of 1000 cycles, gives rise to an alternating current of the corresponding frequency in the circuit 217. The coil 216 forms the primary of a transformer 221 having a secondary coil 222 in a closed oscillatory circuit 223 including a variable condenser 224 and which circuit is tuned to the 1500 cycle frequency and arranged to control a detector 225 of any suitable construction, as for instance a gaseous detector of well known type. In the form shown one side of the condenser 224 leads through a stoppage condenser 226 to a grid 227 of the detector 225, while the other side of the condenser 224 leads to a heated filament 228 of the detector 225. The filament 228 is arranged to be heated in the present instance by a battery 231 controlled by a rheostat 232. The detector 225 controls a circuit 233 including a coil 234 and a high potential battery 235, the latter discharging through the coil 234 and the ionized space between the filament 228 and a plate electrode 236 of the detector 225. The coil 234 also forms part of a closed oscillatory circuit 237 including a variable condenser 238 and which circuit is tuned to the frequency of amplitude variation of the incoming 1500 cycle wave train, or by way of example to 60 cycles per second.

The coil 219 of the circuit 217 forms the primary of a transformer 240 having a secondary coil 241 in a closed oscillatory circuit 242 including a variable condenser 243 which circuit is tuned to the 1000 cycle frequency and arranged to control a detector 244 also shown as of the gaseous type. In the form shown one side of the condenser 243 leads through a stoppage condenser 245 to a grid 246 of the detector 244, while the other side of the condenser 243 leads to a heated filament 247 of the said detector 244, which is arranged to be heated in the present instance by a battery 250 controlled by a rheostat 251. The detector 244 controls a circuit 252 including a coil 253 and a high potential battery 254, the latter discharging through the coil 253 and the ionized space between the filament 247 and a plate electrode 254 of the detector 244. The coil 253 also forms part of a closed oscillatory circuit 255 including a variable condenser 256 and which circuit is tuned to the 60 cycle frequency of amplitude variation of the incoming 1000 cycle wave train.

The coil 234 forms the primary of a transformer 260 having a secondary coil 261 in a circuit, including the leads 262, which is completed through an oscillograph suspension of the type shown in Fig. 1, while the coil 253 forms the primary of a transformer 263 having a secondary coil 264 in a circuit which is completed through a similar oscillograph suspension which is connected to the leads 265.

Having thus described my invention, I claim:

1. A receiving system for radiant energy comprising a plurality of receiving circuits tuned to different high frequencies respectively, a plurality of closed oscillatory circuits controlled by said receiving circuits respectively, and means including a projected beam of light and a selenium cell having a configuration corresponding to the outline traced by the beam of light for controlling a signal, said means being arranged to operate said signal only for a predetermined phase difference between the received high frequencies.

2. A receiving system for radiant energy comprising a plurality of receiving circuits tuned to different high frequencies respectively, a plurality of closed oscillatory circuits controlled by said receiving circuits respectively, means including a variable resistance and a selenium cell having a configuration corresponding to the outline traced by the beam of light to operate a signal, and means including a projected beam of light subject to the coaction of said oscillatory circuits to control said operating means, said controlling means being arranged to maintain said variable resistance constant for a predetermined phase difference between the received high frequencies, whereby said signal is operated only by currents having said predetermined phase difference.

3. A receiving system for radiant energy comprising a plurality of receiving circuits tuned to different high frequencies respectively, a plurality of closed oscillatory circuits controlled by said receiving circuits respectively, means including a selenium cell having a configuration corresponding to the outline traced by the beam of light to operate a signal, and means including a projected beam of light subject to the coaction of said oscillatory circuits to control said operating means, said controlling means being arranged to maintain said light beam on said cell during a predetermined phase difference between the received high frequencies, whereby said signal is operated only by currents having said predetermined phase difference.

4. A receiving system for radiant energy comprising a plurality of receiving circuits tuned to different high frequencies respectively, a plurality of closed oscillatory circuits controlled by said receiving circuits respectively, means including a variable resistance and a selenium cell having a configuration corresponding to the outline traced by the beam of light to operate a signal, and means including a plurality of oscillograph suspensions subject to the coaction of said oscillatory circuits to control said operating means, said controlling means being arranged to maintain said resistance constant for a predetermined phase difference between the received high frequencies, whereby said signal is operated only by currents having said predetermined phase difference.

5. A receiving system for radiant energy comprising a plurality of receiving circuits tuned to different high frequencies respectively, a plurality of closed oscillatory circuits controlled by said receiving circuits respectively, means including a selenium cell of predetermined configuration to operate a signal, means to project a beam of light, a plurality of oscillograph suspensions to control the direction of said beam of light, said suspensions being respectively controlled by said oscillatory circuits and arranged to direct said beam upon said cell within its outline when said received frequencies have a predetermined phase difference whereby said signal is operated only by currents having said predetermined phase difference.

6. A receiving system for radiant energy comprising means responsive to two series of impulses of radiant energy having a predetermined phase difference for causing a beam of light to trace a predetermined outline, a selenium cell having a configuration corresponding to said outline, and means controlled by said cell for operating a signal.

7. A receiving system for radiant energy comprising means responsive to two series of impulses of radiant energy having a predetermined phase difference, means including a selenium cell having a predetermined shape for controlling a signal, and means actuated by said responsive means and controlled by said phase difference for causing a beam of light to be continuously moved to follow the contour of said cell and maintain said cell under the influence of said light beam.

8. The method of receiving radiant energy which consists in transmitting two series of impulses having a predetermined phase difference, causing a beam of light to trace a figure of predetermined configuration by the coaction of said impulses upon a medium of like configuration sensitive to light, and controlling a signal from said medium.

9. A receiving system for radiant energy comprising means responsive to two series of impulses of radiant energy having a predetermined phase difference for causing a beam of light to trace a predetermined outline, a light sensitive cell and means controlled by said cell for producing a signal, said cell being so constructed that it will respond sufficiently to produce a signal only to movements of the light beam having the predetermined outline.

10. A receiving system for high frequency energy comprising a plurality of receiving circuits tuned to different high frequencies respectively, a plurality of oscillating circuits controlled by said receiving circuits respectively, means including a light sensitive cell for operating a signal and means subject to the coaction of said oscillatory circuits for controlling said operating means, said means being adapted to cause a beam of light to trace a predetermined outline in response to a predetermined phase difference between the currents produced in said oscillating circuits and said cell being so constructed that it will respond sufficiently to produce a signal only to movements of the light beam having the predetermined outline.

Signed at Gloucester in the county of Essex and State of Massachusetts this 2nd day of September A. D. 1918.

JOHN HAYS HAMMOND, JR.